(12) United States Patent
Nomura et al.

(10) Patent No.: US 11,861,183 B2
(45) Date of Patent: Jan. 2, 2024

(54) DATA ENCRYPTION AND DECRYPTION IN DISK DEVICE AND STORAGE DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kazumasa Nomura, Tokyo (JP); Kana Furuhashi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 59 days.

(21) Appl. No.: 17/680,137

(22) Filed: Feb. 24, 2022

(65) Prior Publication Data

US 2023/0097610 A1    Mar. 30, 2023

(30) Foreign Application Priority Data

Sep. 21, 2021  (JP) ................................. 2021-153621

(51) Int. Cl.
*G06F 3/06* (2006.01)
*G06F 21/79* (2013.01)
*G06F 21/60* (2013.01)

(52) U.S. Cl.
CPC .......... *G06F 3/0622* (2013.01); *G06F 3/0629* (2013.01); *G06F 3/0659* (2013.01); *G06F 3/0679* (2013.01); *G06F 21/602* (2013.01); *G06F 21/79* (2013.01)

(58) Field of Classification Search
None
See application file for complete search history.

(56) References Cited

U.S. PATENT DOCUMENTS

| | | | |
|---|---|---|---|
| 8,826,041 B1* | 9/2014 | Contreras | H04L 9/3247 713/193 |
| 11,418,331 B1* | 8/2022 | Villapakkam | H04L 9/14 |
| 11,669,625 B2* | 6/2023 | Durham | G06F 21/79 726/26 |
| 2009/0175453 A1* | 7/2009 | Shinbori | H04L 9/0891 380/277 |
| 2013/0124861 A1 | 5/2013 | Chinen et al. | |
| 2015/0227755 A1* | 8/2015 | Lee | G06F 21/79 713/165 |

(Continued)

FOREIGN PATENT DOCUMENTS

| | | |
|---|---|---|
| JP | 2002-175210 A | 6/2002 |
| JP | 2009-111687 A | 5/2009 |

*Primary Examiner* — Edward J Dudek, Jr.
*Assistant Examiner* — Ralph A Verderamo, III
(74) *Attorney, Agent, or Firm* — Kim & Stewart LLP (57) ABSTRACT

A disk device includes a volatile memory, a nonvolatile memory, and a controller. The controller is configured to receive, from a host, a key setting request that includes a cryptographic key, a key ID thereof, and tag information of the cryptographic key and generate generation information of the cryptographic key. The controller is also configured to store a first entry including the tag information, the cryptographic key, and the generation information associated with each other in the volatile memory, and store a second entry including the key ID and the generation information associated with each other in the nonvolatile memory.

20 Claims, 11 Drawing Sheets

(56) References Cited

U.S. PATENT DOCUMENTS

2017/0103025 A1* 4/2017 Meyer .................... G06F 21/79
2020/0242257 A1* 7/2020 Trantham ................ G06F 21/79
2021/0184848 A1* 6/2021 Roowalla ............ G06F 11/3006

* cited by examiner

FIG. 1

--- CONTROL SIGNAL
— DATA

| KeyID TABLE | |
|---|---|
| KeyID | KeyGen |
| KeyID-0(0123456789abcdef···) | 1 |
| – | – |
| – | – |
| – | – |

| KeyID TABLE | |
|---|---|
| KeyID | KeyGen |
| KeyID-0(0123456789abcdef···) | 1 |
| KeyID-1(abcdef0123456789···) | 2 |
| – | – |
| – | – |

| Key Table | | |
|---|---|---|
| Key Tag | Key | KeyGen |
| 0 | – | – |
| 1 | – | – |
| 2 | – | – |
| 3 | Key0 | 1 | ~71a

FIG. 6B

| Key Table | | |
|---|---|---|
| Key Tag | Key | KeyGen |
| 0 | – | – |
| 1 | – | – |
| 2 | Key1 | 2 | ~71b
| 3 | Key0 | 1 | ~71a

FIG. 6C

| Key Table | | |
|---|---|---|
| Key Tag | Key | KeyGen |
| 0 | – | – |
| 1 | Key1 | 2 | ~71c
| 2 | Key1 | 2 | ~71b
| 3 | Key0 | 1 | ~71a

FIG. 7A

| Key TABLE | | |
|---|---|---|
| Key Tag | Key | KeyGen |
| 0 | – | – |
| 1 (71c) | Key2 | 3 |
| 2 (71b) | Key1 | 2 | ← KEY USED IN Read
| 3 (71a) | Key0 | 1 | ← KEY USED IN Write

FIG. 7B

| KeyGen | USER DATA | ECC/CRC |
|---|---|---|
| 1 | DATA ENCRYPTED WITH Key 0 | |

FIG. 7C

| KeyGen | USER DATA | ECC/CRC |
|---|---|---|
| 1 | DATA ENCRYPTED WITH Key 1 | |

| AFTER SETTING KeyID-1001, 1002 | |
|---|---|
| KeyID | KeyGen |
| KeyID-1001 | 1002 |
| KeyID-1002 | 1003 |
| Empty | – |
| ... | ... |
| Empty | – |
| Empty | – |

~61d (row KeyID-1001)
~61e (row KeyID-1002)

FIG. 11D

| Key Table (SETTING Key-1001) | | |
|---|---|---|
| KeyTag | Key | KeyGen |
| 00 | Key-1001 | 1002 |
| Empty | – | – |

DATA ENCRYPTION AND DECRYPTION IN DISK DEVICE AND STORAGE DEVICE

CROSS-REFERENCE TO RELATED APPLICATION(S)

This application is based upon and claims the benefit of priority from Japanese Patent Application No. 2021-153621, filed Sep. 21, 2021, the entire contents of which are incorporated herein by reference.

FIELD

Embodiments described herein relate generally to a disk device and a storage device.

BACKGROUND

A storage device determines whether a cryptographic key used for encrypting data to be stored therein and a cryptographic key used for decrypting the stored data match each other by referring to key update history information. In certain situations, a host, not a storage device, generates such a cryptographic key, and sends the cryptographic key to the storage device. It is desirable to appropriately check whether a key used for decrypting data and a key obtained from the host match each other.

DETAILED DESCRIPTION

Embodiments provide a disk device or a storage device that appropriately checks whether a key used for encrypting data and a key obtained from a host match each other when an encryption key is generated on a host side.

In general, according to an embodiment, a disk device includes a volatile memory, a nonvolatile memory, and a controller. The controller is configured to receive, from a host, a key setting request that includes a cryptographic key, a key ID thereof, and tag information of the cryptographic key and generate generation information of the cryptographic key. The controller is also configured to store a first entry including the tag information, the cryptographic key, and the generation information associated with each other in the volatile memory, and store a second entry including the key ID and the generation information associated with each other in the nonvolatile memory.

First Embodiment

Figure 1:
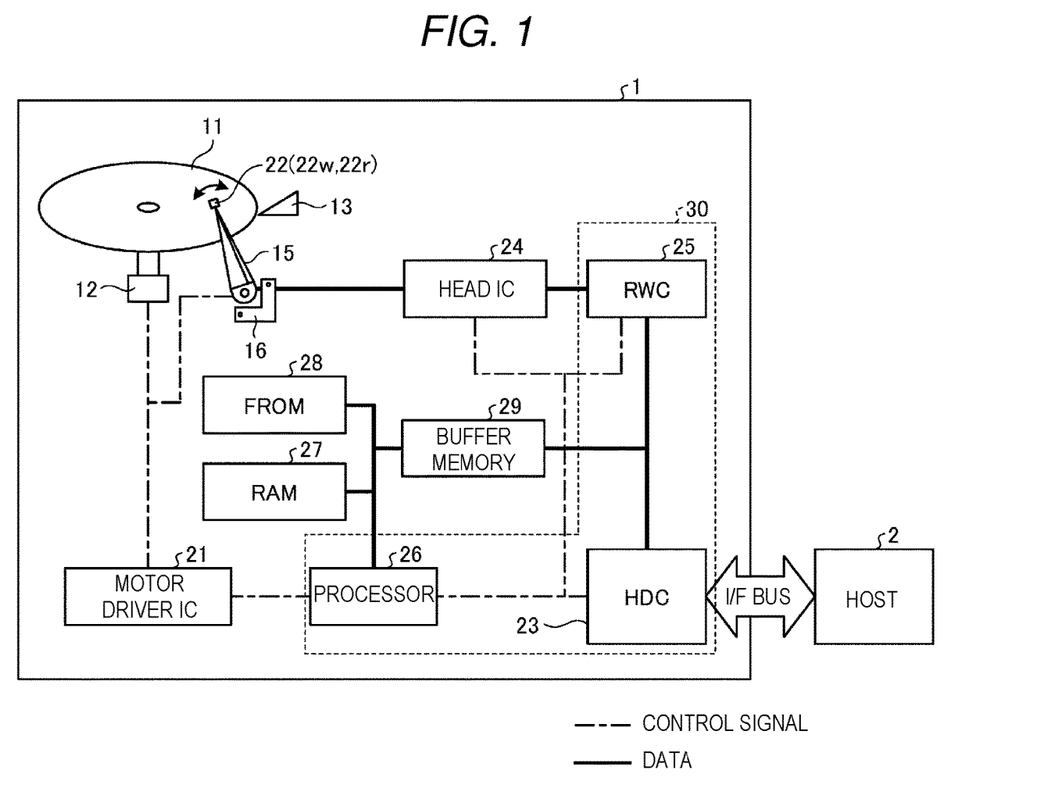
FIG. 1 is a schematic diagram showing an example of a configuration of a magnetic disk device according to a first embodiment.

FIG. 1 is a schematic diagram showing an example of a configuration of a magnetic disk device 1 according to a first embodiment.

The magnetic disk device 1 is connected to a host 2. The magnetic disk device 1 can receive, from the host 2, an access command such as an encryption key set command, a write command, and a read command.

The magnetic disk device 1 includes a magnetic disk 11 having a recording surface formed on a surface thereof. The magnetic disk device 1 writes data and reads data into/from the magnetic disk 11 (more precisely, the recording surface of the magnetic disk 11) in response to the access command. The magnetic disk device 1 may include a plurality of magnetic disks 11, but in the present embodiment, the magnetic disk device 1 includes one magnetic disk 11 for simplification of description and illustration.

Data is written and read via a magnetic head 22. Specifically, in addition to the magnetic disk 11, the magnetic disk device 1 includes a spindle motor 12, a motor driver integrated circuit (IC) 21, the magnetic head 22, an actuator arm 15, a voice coil motor (VCM) 16, a lamp 13, a head IC 24, a read/write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21. The magnetic disk 11 is an example of the nonvolatile memory.

The motor driver IC 21 controls rotation of the spindle motor 12 and rotation of the VCM 16.

The magnetic head 22 writes data and reads data into/from the magnetic disk 11 by a write element 22w and a read element 22r provided in the magnetic head 22, respectively. In addition, the magnetic head 22 is attached to a tip end of the actuator arm 15. The magnetic head 22 is moved along a radial direction of the magnetic disk 11 by the VCM 16 driven by the motor driver IC 21.

When rotation of the magnetic disk 11 is stopped, the magnetic head 22 is moved onto the lamp 13. The lamp 13 is configured to hold the magnetic head 22 at a position separated from the magnetic disk 11.

During a read operation, the head IC 24 amplifies a signal read from the magnetic disk 11 by the magnetic head 22 and supplies the amplified signal to the RWC 25. In addition, the head IC 24 amplifies a signal corresponding to data to be written supplied from the RWC 25 and supplies the amplified signal to the magnetic head 22.

The HDC 23 controls transmission and reception of data to/from the host 2 via an I/F bus, controls the buffer memory 29, and performs an error correction process on the read data.

The buffer memory 29 is used as a buffer of data transmitted and received to/from the host 2. For example, the buffer memory 29 is used to temporarily store data to be written into the magnetic disk 11 or data read from the magnetic disk 11.

The buffer memory 29 is implemented by, for example, a volatile memory capable of high-speed operation. Types of a memory implementing the buffer memory 29 are not limited to a specific type. The buffer memory 29 may be implemented by, for example, a dynamic random access memory (DRAM), a static random access memory (SRAM), or a combination thereof.

The RWC 25 modulates data to be written, which is supplied from the HDC 23, and supplies the data to the head IC 24. In addition, the RWC 25 demodulates a signal read from the magnetic disk 11 and supplied via the head IC 24 and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. Firmware (program data) and various operation parameters are stored in the FROM 28. The firmware may be stored in the magnetic disk 11.

The RAM 27 is implemented by, for example, a DRAM, an SRAM, or a combination thereof. The RAM 27 is used as a memory for an operation by the processor 26. The RAM 27 is used as a region where the firmware is loaded and a region where various management data are stored.

The processor 26 controls the magnetic disk device 1 according to the firmware stored in the FROM 28 or the magnetic disk 11. For example, the processor 26 loads the firmware from the FROM 28 or the magnetic disk 11 into the RAM 27, and controls the motor driver IC 21, the head IC 24, the RWC 25, the HDC 23, and the like according to the loaded firmware.

A configuration including the RWC 25, the processor 26, and the HDC 23 can also be regarded as a controller 30. In addition to these elements, the controller 30 may include other elements (for example, the RAM 27, the FROM 28, the buffer memory 29, or the RWC 25).

When a write command is received from the host 2, the magnetic disk device 1 encrypts user data, which is the data to be written, and stores the encrypted user data in the magnetic disk 11. There is a specification in which a host, instead of a magnetic disk device, generates an encryption key, and the magnetic disk device receives the encryption key from the host, encrypts the user data by using the encryption key, and does not store the encryption key in the magnetic disk. In the case of such a specification, since the encryption key is not stored in the magnetic disk, it is desirable to appropriately determine whether the encryption key received from the host is the encryption key used for encrypting the user data. To address such an issue, the magnetic disk device 1 according to the present embodiment determines whether the encryption key received from the host 2 is an appropriate encryption key by managing, using table information, generation information of the encryption key received from the host 2.

When a Key (,which is an encryption/decryption key), a KeyID (,which is an encryption/decryption key identifier), and a KeyTag (,which is tag information of the encryption/decryption key) are received from the host 2, and an encryption key set command is received from the host 2, the controller 30 of the magnetic disk device 1 generates Key table information and KeyID table information. The tag information of the encryption/decryption key is information indicating a storage region to which the encryption/decryption key is applied.

Figure 2:
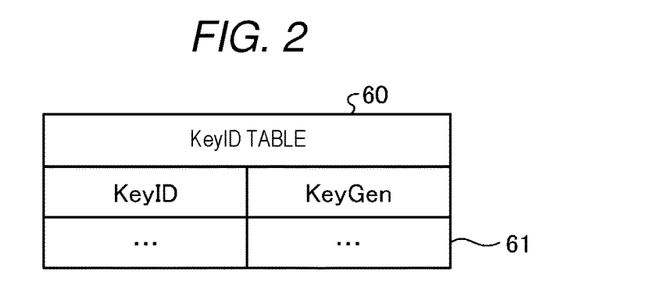
FIG. 2 shows an example of a KeyID table in the first embodiment.

FIG. 2 is a diagram showing a data structure of a KeyID table 60. The KeyID table 60 is stored in the magnetic disk 11. The KeyID table 60 is a table that stores record information (may be referred to as "entry") 61 including a KeyID and a KeyGen. The KeyID received from the host 2 is included in the record information 61. The generation information of the encryption/decryption key is included in the record information 61. The generation information of the encryption/decryption key is, for example, information indicating an order of KeyIDs registered to the KeyID table 60, and is number information for identifying the KeyIDs. The KeyID table 60 may be stored in a nonvolatile storage region other than the magnetic disk 11.

When the encryption key set command is received from the host 2, the controller 30 searches the KeyID table 60. When there is no record information 61 including the KeyID received from the host 2, the controller 30 generates a new KeyGen and registers, in the KeyID table 60, the record information 61 including the KeyID received from the host 2 and the new KeyGen.

Figure 3:
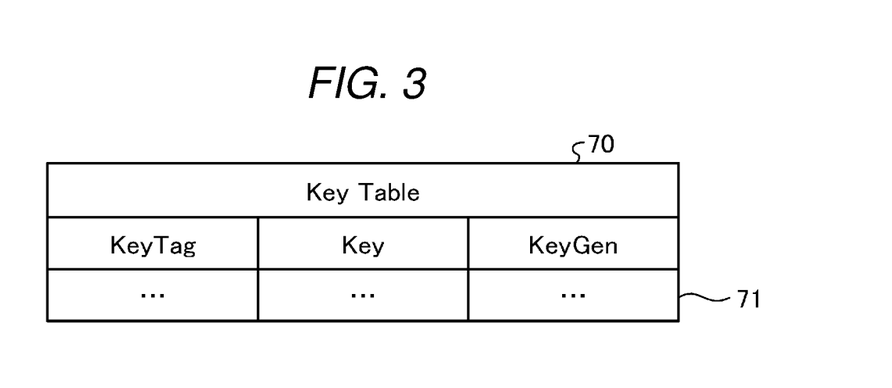
FIG. 3 shows an example of a Key table in the first embodiment.

FIG. 3 is a diagram showing a data structure of a Key table 70. The Key table 70 is stored in, for example, the buffer memory 29 or the RAM 27. The Key table 70 is a table that stores record information (may be referred to as "entry") 71 including a KeyTag, a Key, and a KeyGen. The KeyTag received from the host 2 is included in the record information 71. The Key received from the host 2 is included in the record information 71. The new KeyGen generated by the controller 30 is included in the record information 71.

When the encryption key set command is received from the host 2, the controller 30 registers, in the Key table 70, the record information 71 including the KeyTag received from the host 2, the Key received from the host 2, and the new KeyGen. When the record information 71 including a Key same as the Key received from the host 2 and a KeyTag same as the KeyTag received from the host 2 is stored in the Key table 70, the controller 30 may not necessarily newly generate the record information 71 based on the information received from the host 2.

In addition, when a KeyTag and user data to be written are received from the host 2 and a write command is received from the host 2, the controller 30 searches for the record information 71 corresponding to the KeyTag received from the host 2, encrypts the user data received from the host 2 by using a Key in the searched record information, and stores, in the magnetic disk 11, information including the KeyGen in the searched record information 71 and the encrypted user data that are associated with each other.

In addition, when a KeyTag of data to be read is received from the host 2 and a read command of the user data is received from the host 2, the controller 30 searches for the record information 71 corresponding to the KeyTag received from the host 2. The controller 30 decrypts target user data by using a Key in the searched record information 71, and determines whether a KeyGen corresponding to the user data and a KeyGen in the searched record information 71 match each other. When the two KeyGens match each other, the controller 30 transmits the decrypted user data to the host 2. In addition, when the two KeyGens do not match each other, the controller 30 sends an error notification to the host 2.

Subsequently, an update state of information stored in the KeyID table 60 and the Key table 70 when the controller 30 receives the encryption key set command, the write command, and the read command will be described with reference to FIG. 4, FIG. 5A and FIG. 5B, and FIG. 6A to FIG. 6C.

Figure 4:
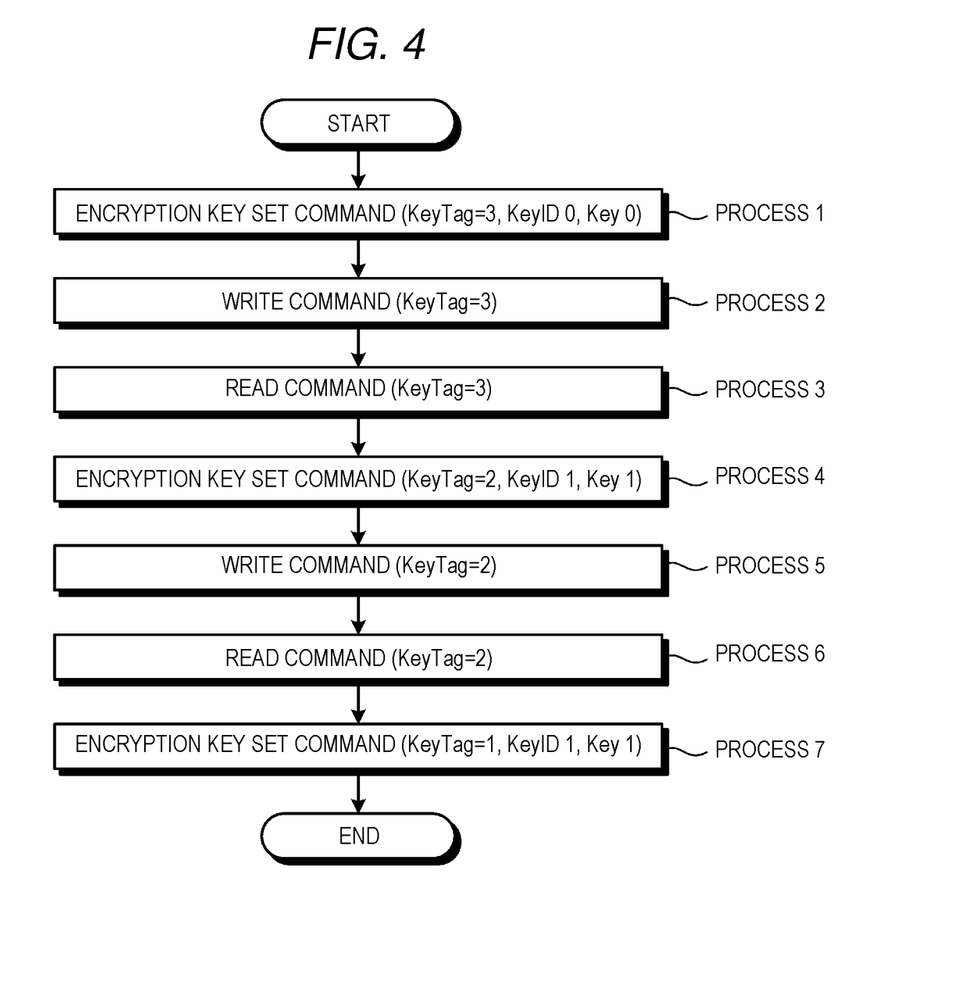
FIG. 4 is a flowchart showing a command execution procedure in the first embodiment.
Figure 5A:
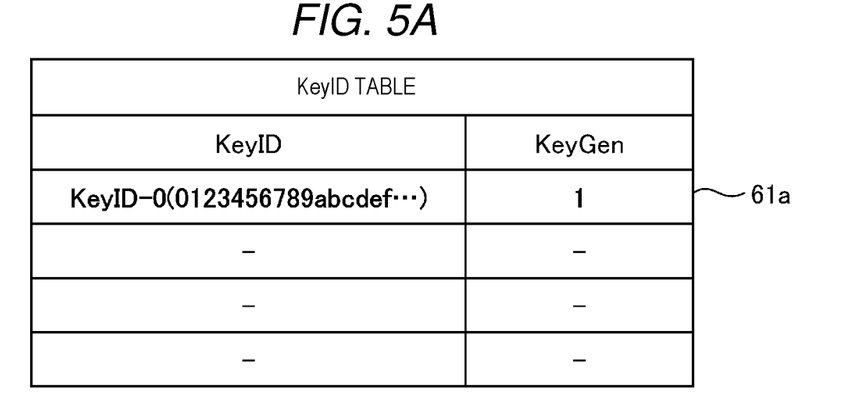
FIGS. 5A and 5B show examples of the KeyID table in the first embodiment.
Figure 5B:
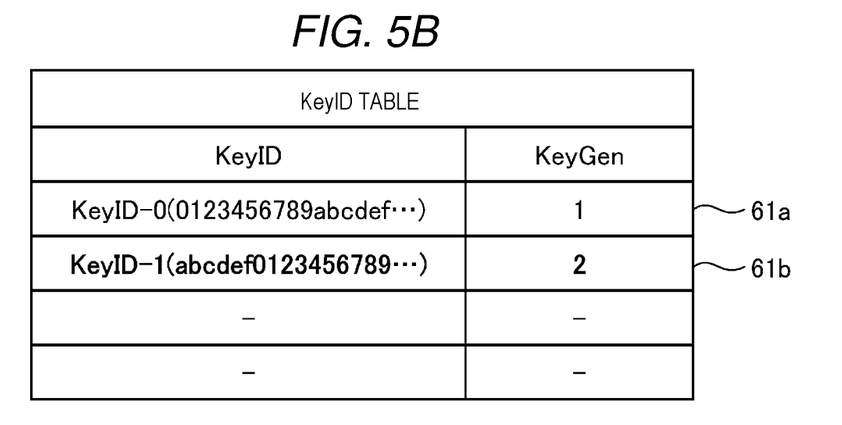
Figure 6A:
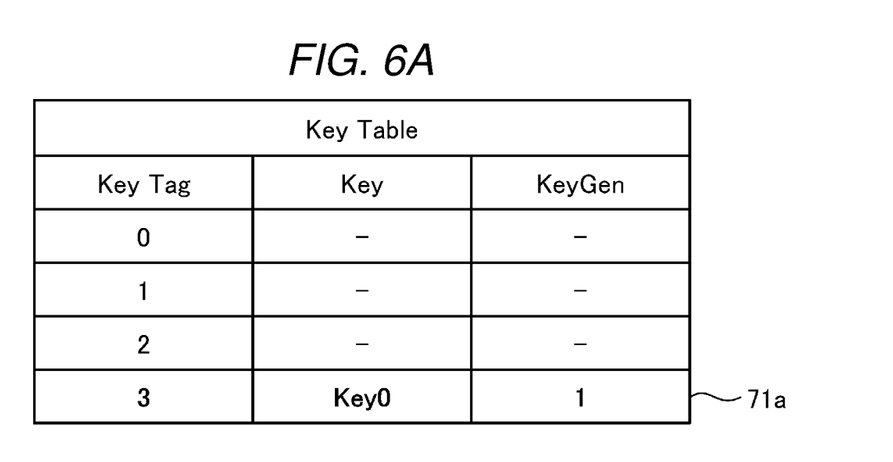
FIGS. 6A, 6B, and 6C show examples of the Key table in the first embodiment.
Figure 6B:
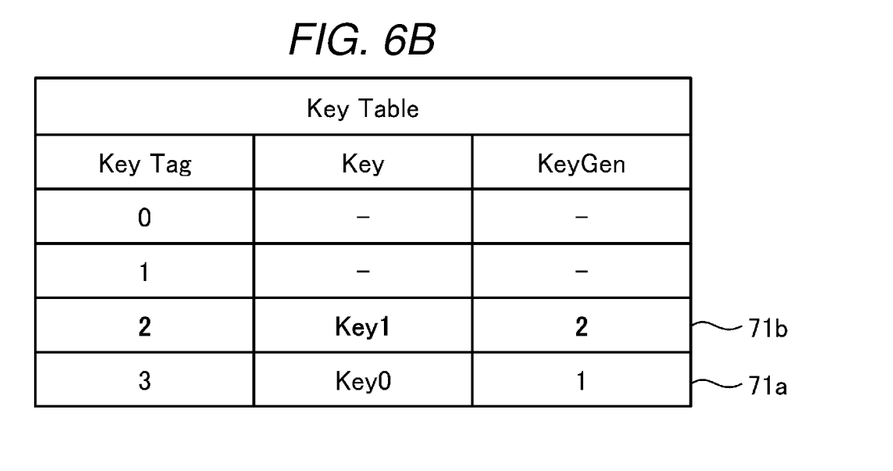
Figure 6C:
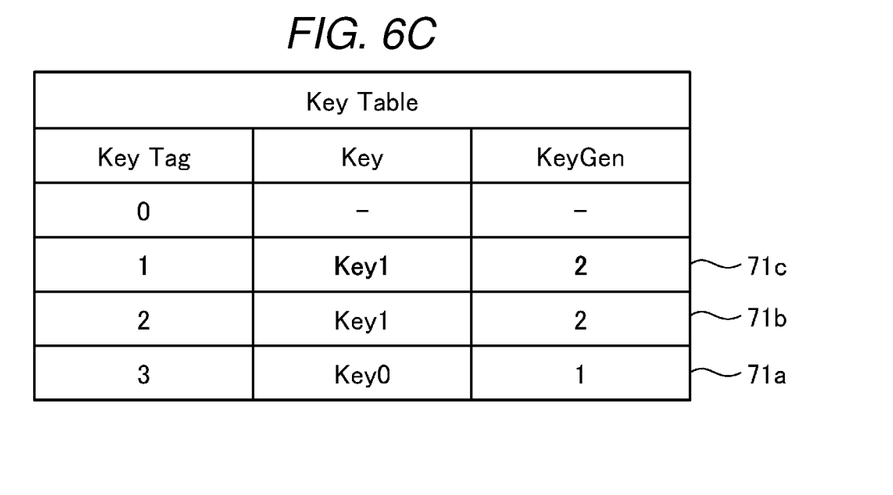

FIG. 4 is a flowchart showing a procedure for executing a command received from the host 2. FIG. 5A and FIG. 5B are diagrams showing information stored in the KeyID table 60. FIG. 6A to FIG. 6C are diagrams showing information stored in the Key table 70. Here, it is assumed that no record information 61 is stored in the KeyID table 60 and no record information 71 is stored in the Key table 70.

First, in process 1 in FIG. 4, the controller 30 receives, from the host 2, information indicating that the KeyTag is 3, the KeyID is KeyID 0, and the Key is Key 0, and receives an encryption key set command.

The controller 30 searches the KeyID table 60 for the record information 61 indicating that the Key is Key 0. Since there is no record information 61 in an initial state, the controller 30 generates 1 as a value of the KeyGen. Then, the controller 30 registers, in the KeyID table 60, record information 61a including KeyID 0 and KeyGen 1, as shown in FIG. 5A. In addition, the controller 30 stores, in the Key table 70, record information 71a including KeyTag 3, Key 0, and KeyGen 1, as shown in FIG. 6A.

Returning to FIG. 4, the controller 30 receives, from the host 2, information indicating KeyTag 3 and receives a write command (process 2). The controller 30 searches the Key table 70 for the record information 71a including KeyTag 3. Then, the controller 30 encrypts the user data by using the Key 0 in the record information 71a, and stores, in the magnetic disk 11, the encrypted user data and data indicating that the KeyGen is 1.

Returning to FIG. 4, the controller 30 receives, from the host 2, information indicating that the KeyTag is 3 and receives a read command (process 3). The controller 30 searches the Key table 70 for the record information 71a including KeyTag 3. Then, the controller 30 decrypts the user data by using the Key 0 in the record information 71a, and determines that encryption keys are different when the KeyGen read along with the user data does not match the KeyGen in the record information 71a. Accordingly, the controller 30 can determine that the read storage region is not written yet, or that the read storage region is a storage region encrypted with a different encryption key.

Returning to FIG. 4, the controller 30 receives, from the host 2, information indicating that the KeyTag is 2, the KeyID is KeyID 1, and the Key is Key 1, and receives an encryption key set command (process 4).

The controller 30 searches the KeyID table 60 for the record information 61 including Key 1. As shown in FIG. 5A, since there is no record information 61 including Key 1, the controller 30 generates 2 as the value of the KeyGen. Then, the controller 30 registers, in the KeyID table 60, record information 61b including KeyID 1 and KeyGen 2, as shown in FIG. 5B. In addition, the controller 30 stores, in the Key table 70, record information 71b including KeyTag 2, Key 1, and KeyGen 2, as shown in FIG. 6B.

Returning to FIG. 4, the controller 30 receives, from the host 2, information indicating that the KeyTag is 2 and receives a write command (process 5). The controller 30 searches the Key table 70 for the record information 71b including KeyTag 2. Then, the controller 30 encrypts the user data by using the Key 1 in the record information 71b, and stores, in the magnetic disk 11, the encrypted user data and KeyGen 2.

Returning to FIG. 4, the controller 30 receives, from the host 2, information indicating that the KeyTag is 2 and receives a read command (process 6). The controller 30 searches the Key table 70 for the record information 71b including the KeyTag is 2. Then, the controller 30 decrypts the user data by using the Key 2 in the record information 71b, and determines that encryption keys are different when the KeyGen read along with the user data does not match the KeyGen in the record information 71b.

Returning to FIG. 4, the controller 30 receives, from the host 2, information indicating that the KeyTag is 1, the KeyID is KeyID 1, and the Key is Key 1, and receives an encryption key set command (process 7).

The controller 30 searches the KeyID table 60 for the record information 61 including Key 1. As shown in FIG. 5B, since there is the record information 61b including Key 1, the controller 30 does not newly register the record information 61 in the KeyID table 60. Since there is no record information 71 including KeyTag 1 and Key 1, the controller 30 stores, in the Key table 70, record information 71c including KeyTag 1, Key 1, and KeyGen 2, as shown in FIG. 6C.

Figure 7A:
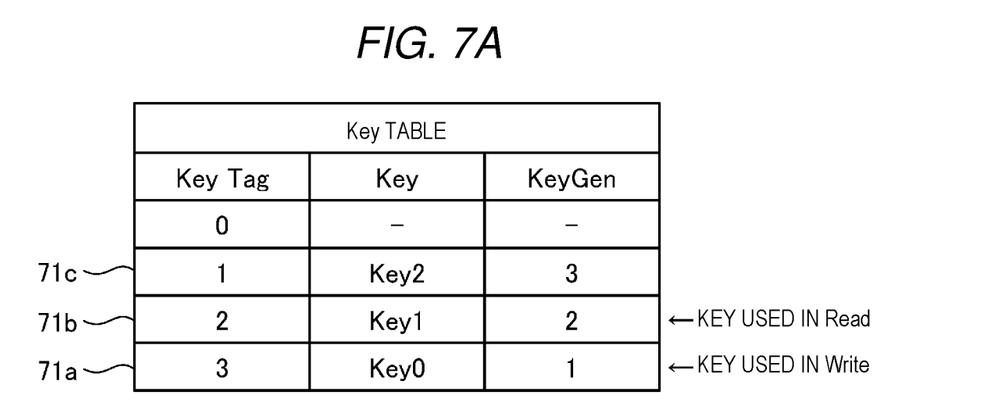
FIGS. 7A, 7B, and 7C show examples of the Key table in the first embodiment.

Subsequently, control during the read will be described with reference to FIG. 7A to FIG. 7C. FIG. 7A shows an example of the Key table 70. The Key table 70 includes the record information 71c including KeyTag 1, Key 2, and KeyGen 3. In addition, the Key table 70 includes the record information 71b including KeyTag 2, Key 1, and KeyGen 2. Further, the Key table 70 includes the record information 71a including KeyTag 3, Key 0, and KeyGen 1.

Figure 7B:
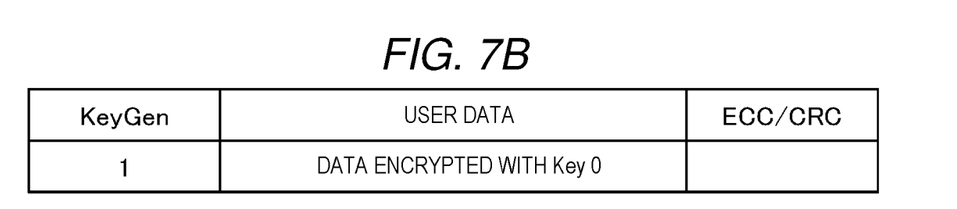
Figure 7C:
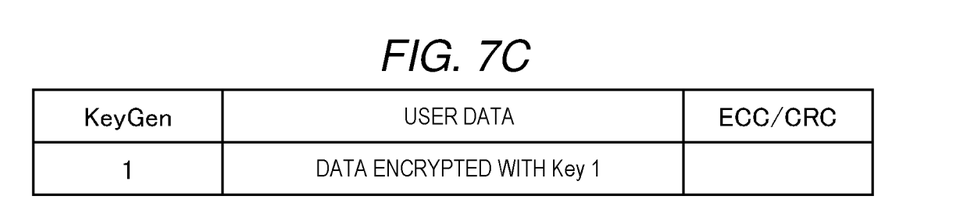

FIG. 7B is an example of a case when data is written during a write operation. The KeyGen is set to 1 and the data is encrypted with Key 0. FIG. 7C is an example of a case when read data is determined to be an error. As shown in FIG. 7C, the KeyGen is 1, whereas the data is encrypted with Key 1. An error is found in the encryption/decryption key since the Key corresponding to KeyGen 1 is Key 0.

Figure 8:
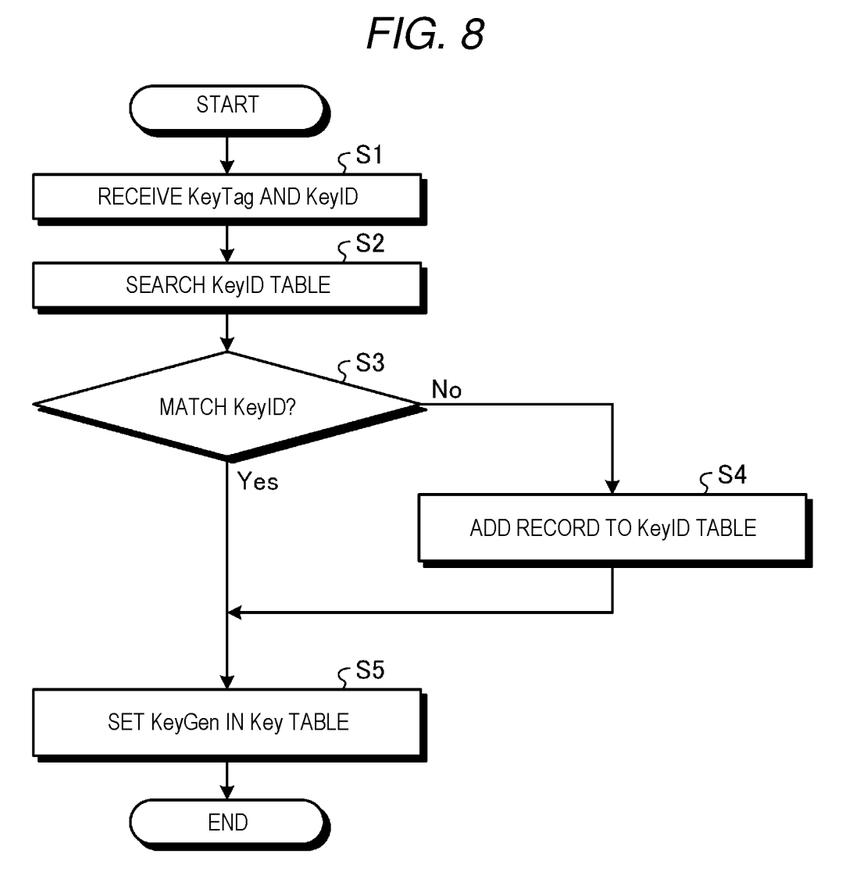
FIG. 8 is a flowchart of processes when an encryption key set command is received in the first embodiment.

FIG. 8 is a flowchart of processes when an encryption key set command is received. The controller 30 receives the KeyTag, the KeyID, and the Key from the host 2 and receives an encryption key set command (step S1). The controller 30 searches the KeyID table 60 for the record information 61 corresponding to the KeyID received from the host 2 (step S2). When there is no record information 61 that includes the received KeyID (No in step S3), the controller 30 generates a value of the KeyGen, newly adds the record information 61 to the KeyID table 60 (step S4), and then causes the process to proceed to step S5. In addition, when there is the record information 61 that includes the received KeyID in step S3 (Yes in step S3), the controller 30 causes the process to proceed to step S5. In step S5, the record information 71 including the KeyGen generated in step S4 is registered in the Key table 70 (step S5).

Figure 9:
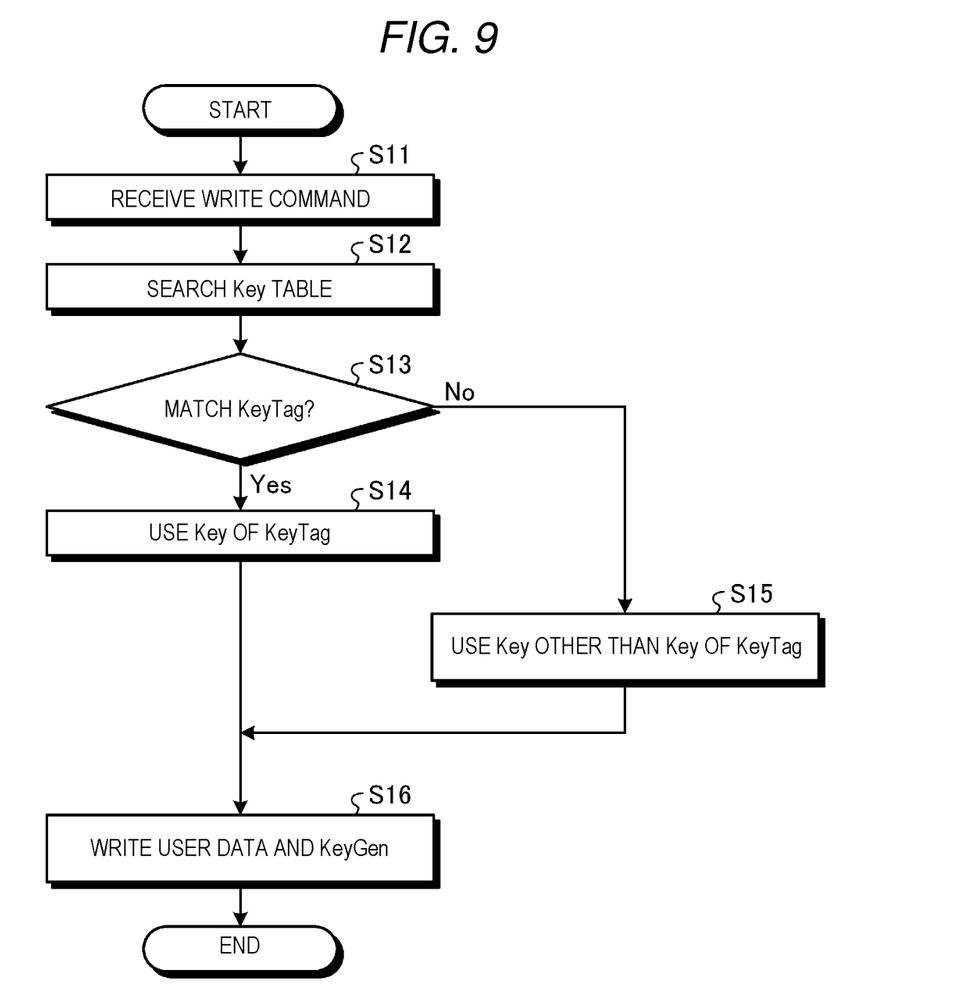
FIG. 9 is a flowchart of processes when a write command is received in the first embodiment.

FIG. 9 is a flowchart of processes when a write command is received. The controller 30 receives the KeyTag from the host 2 and receives a write command (step S11). The controller 30 searches the Key table 70 for the record information 71 corresponding to the KeyTag received from the host 2 (step S12). When there is no record information 71 that includes the received KeyTag (No in step S13), the controller 30 encrypts the user data by using a Key of a KeyTag other than the KeyTag received from the host 2 (step S15), and causes the process to proceed to step S16. In addition, when there is the record information 71 that includes the received KeyTag in step S13 (Yes in step S13), the controller 30 encrypts the user data by using the Key in the record information 71 (step S14), and causes the process to proceed to step S16. In step S16, the encrypted user data and the KeyGen are stored in the magnetic disk 11 (step S16).

Since the encrypted user data and a KeyGen that can be smaller in size than the KeyID are stored in association with each other, it is possible to prevent the controller 30 from unnecessarily using a magnetic disk region.

Figure 10:
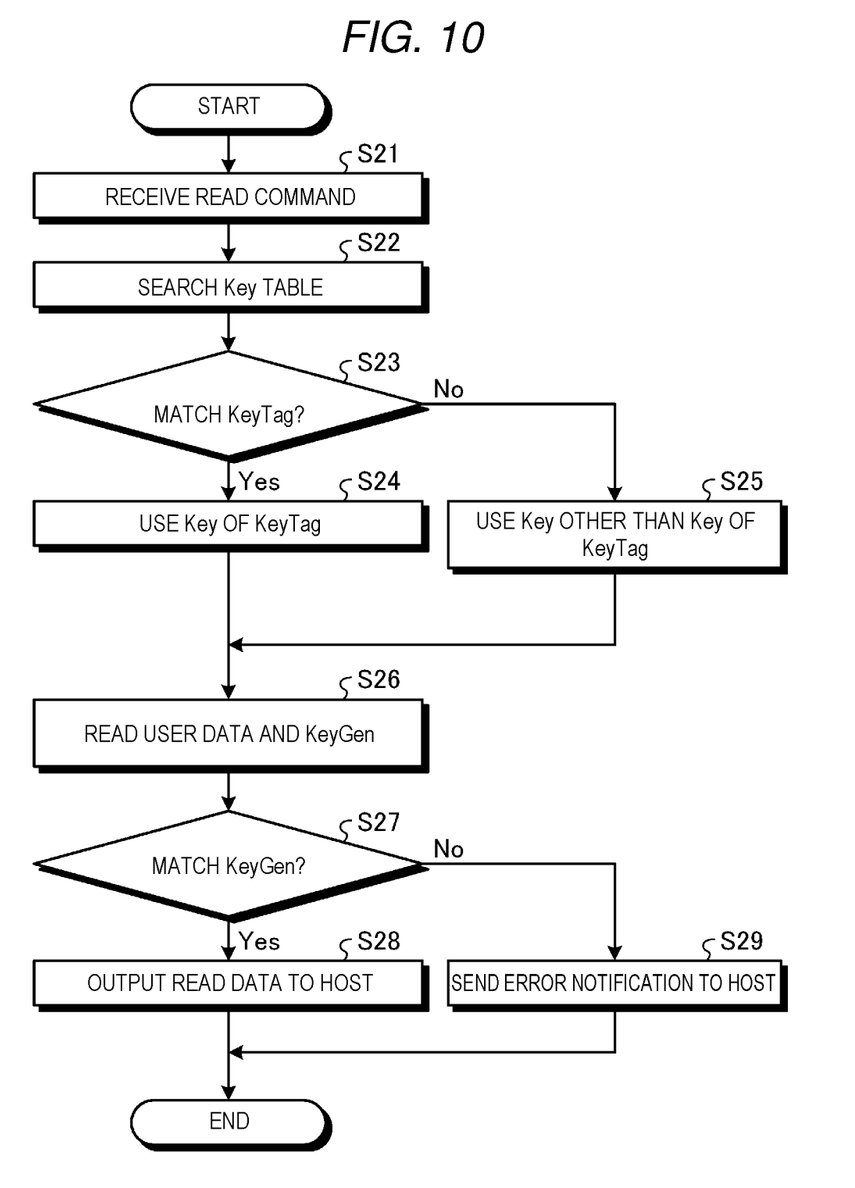
FIG. 10 is a flowchart of processes when a read command is received in the first embodiment.

FIG. 10 is a flowchart of processes when a read command is received. The controller 30 receives the KeyTag from the host 2 and receives a read command (step S21). The controller 30 searches the Key table 70 for the record information 71 corresponding to the KeyTag received from the host 2 (step S22). When there is no record information 71 that includes the received KeyTag (No in step S23), the controller 30 decrypts the user data by using a Key of a KeyTag other than the KeyTag received from the host 2 (step S25), and causes the process to proceed to step S26. When there is the record information 71 that includes the received KeyTag in step S23 (Yes in step S23), the controller 30 decrypts the user data by using the Key in the record information 71 (step S24), and causes the process to proceed to step S26. In step S26, the controller 30 reads information including the decrypted user data and the KeyGen (step S26). When a KeyGen read along with the user data and a KeyGen in the searched record information 71 match each other (Yes in step S27), the controller 30 outputs the read data to the host 2 (step S28). In addition, when the KeyGen read along with the user data and the KeyGen in the searched record information 71 do not match each other in step S27 (No in step S27), the controller 30 sends an error notification to the host 2 (step S29).

In such a manner, the controller 30 determines whether the key used for encryption and the key used for decryption match each other by determining whether the KeyGen read along with the user data and the KeyGen in the searched record information 71 match each other.

In the above description, when the encryption key set command is received from the host 2, the controller 30 generates a new KeyGen, and registers, in the KeyID table 60 of the magnetic disk 11, the record information 61 including the KeyID received from the host 2 and the new KeyGen. In addition, the controller 30 registers, in the Key table 70 of the buffer memory 29 or the RAM 27, the record information 71 including the KeyTag received from the host 2, the Key received from the host 2, and the new KeyGen.

In such a manner, by storing the KeyGen in the magnetic disk 11, the buffer memory 29 or the RAM 27, and storing the Key in the buffer memory 29 or the RAM 27, the magnetic disk device 1 can manage generation information of a key without storing the Key in the magnetic disk 11. Accordingly, it can be appropriately determined whether the encryption key received from the host 2 is an old encryption key.

In addition, when there is no record information 61 corresponding to the KeyID received from the host 2, the controller 30 stores, in the magnetic disk 11, the record information 61 based on the information received from the host 2, and stores, in the buffer memory 29 or the RAM 27, the record information 71 based on the information received from the host 2. Thus, since the record information 61 and the record information 71 are newly stored only when a new KeyID is received, it is possible to prevent the controller 30 from storing unnecessary data.

Second Embodiment

In a second embodiment, the magnetic disk device 1 performs output control on a result of determining whether an encryption key is appropriate when an encryption key is made unrecoverable with respect to encrypted data recorded in the magnetic disk 11.

A main purpose of the host 2 transmitting the Key and the KeyID to the magnetic disk device 1 is to enable the magnetic disk device 1 to detect whether an encryption key used for encryption and a decryption key used for decryption match each other.

In the magnetic disk device 1 according to the first embodiment, when an encryption key used for encryption and a decryption key used for decryption do not match each other, the magnetic disk device 1 sends, to the host 2, a notification that encryption keys do not match each other.

On the other hand, in the second embodiment, the magnetic disk device 1 performs a secure instance erase function, which is a function of making an encryption key that has been used to encrypt user data written in the magnetic disk 11 unrecoverable. In this case, it is not necessary to actually erase the data in the magnetic disk 11. When data written before performing the secure instance erase function on the magnetic disk 11 is read after performing the secure instance erase function, it is desirable to transfer the read data to the host 2 without detecting a mismatch between the encryption key and the decryption key.

Here, update states of information stored in the KeyID table 60 or the Key table 70 before and after performing the secure instance erase function will be described with reference to FIG. 11A to FIG. 11D.

Figure 11A:
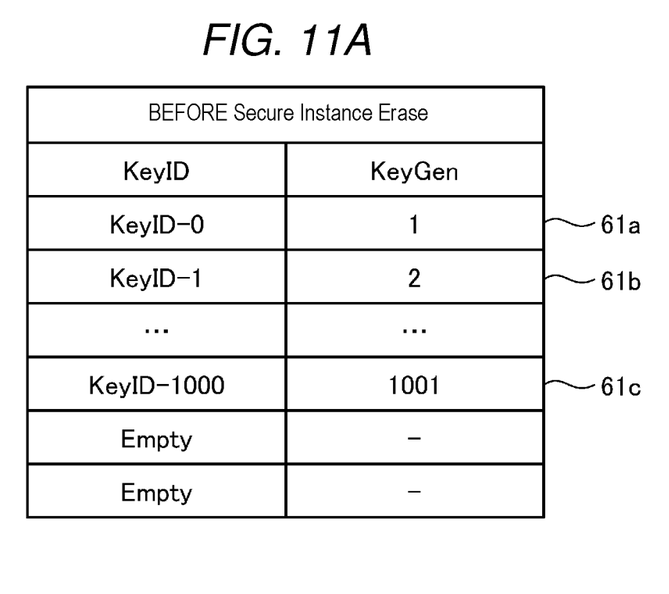
FIGS. 11A, 11B, and 11C show examples of a KeyID table in a second embodiment.

First, the KeyID table 60 before performing the secure instance erase function is shown in FIG. 11A. As shown in FIG. 11A, the record information 61 (the record information 61a, the record information 61b, etc.) including KeyID-0, KeyID 1000, etc., are stored in the KeyID table 60. In addition, the Key table 70 stores a record information 71 including KeyGen common to the KeyGen in the record information 61.

Figure 11B:
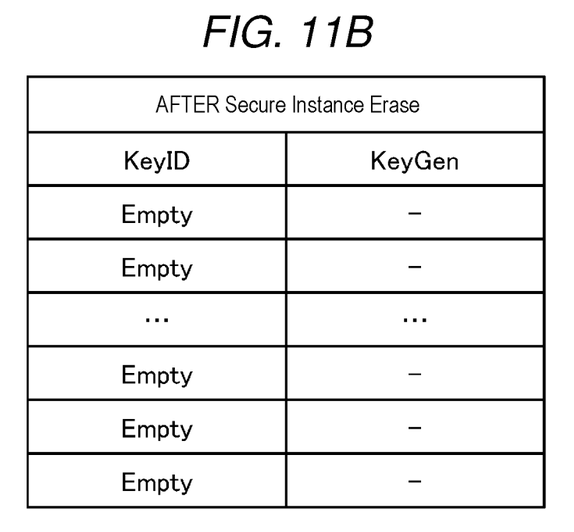

When the controller 30 performs the secure instance erase function, the encryption key is invalidated, as shown in FIG. 11B. As a result, all the record information 61 in the KeyID table 60 are deleted. In addition, the controller 30 deletes all the record information 71 in the Key table 70.

Figure 11C:
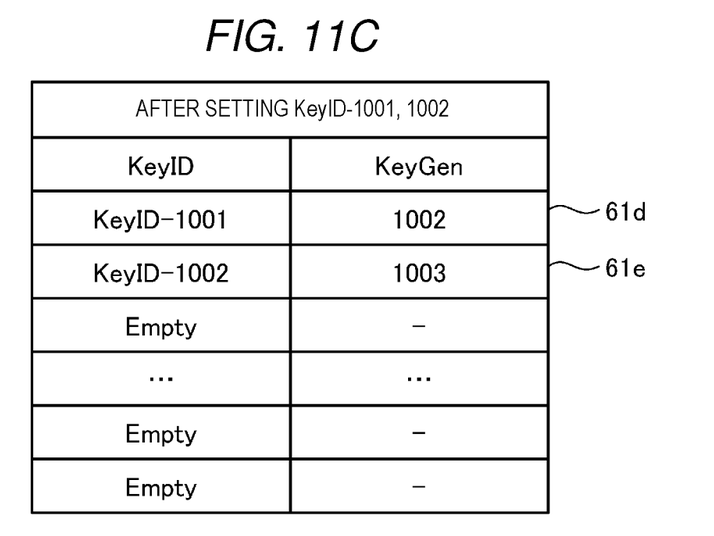
Figure 11D:
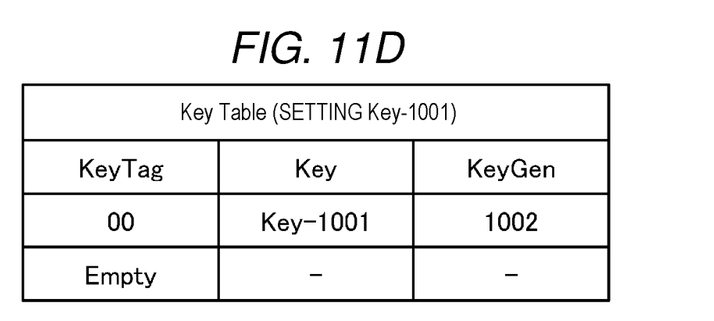
FIG. 11D shows an example of a Key table in the second embodiment.

When an encryption key set command is received from the host 2 after performing the secure instance erase function and deleting the record information 61 in the KeyID table 60, new record information 61 is added to the KeyID table 60 in response to the encryption key set command. An example in which the record information 61 is newly added is shown in FIG. 11C. As shown in FIG. 11C, the KeyID table 60 includes record information 61d including KeyID-1001 and record information 61e including KeyID-1002. In addition, the Key table 70 in this state includes the record information 71 including KeyTag 00, Key-1001, and KeyGen 1002, as shown in FIG. 11D.

In such a state, it is determined whether read data is data encrypted before performing the secure instance erase function, and the read data is transmitted to the host 2 based on the determination result.

Figure 12:
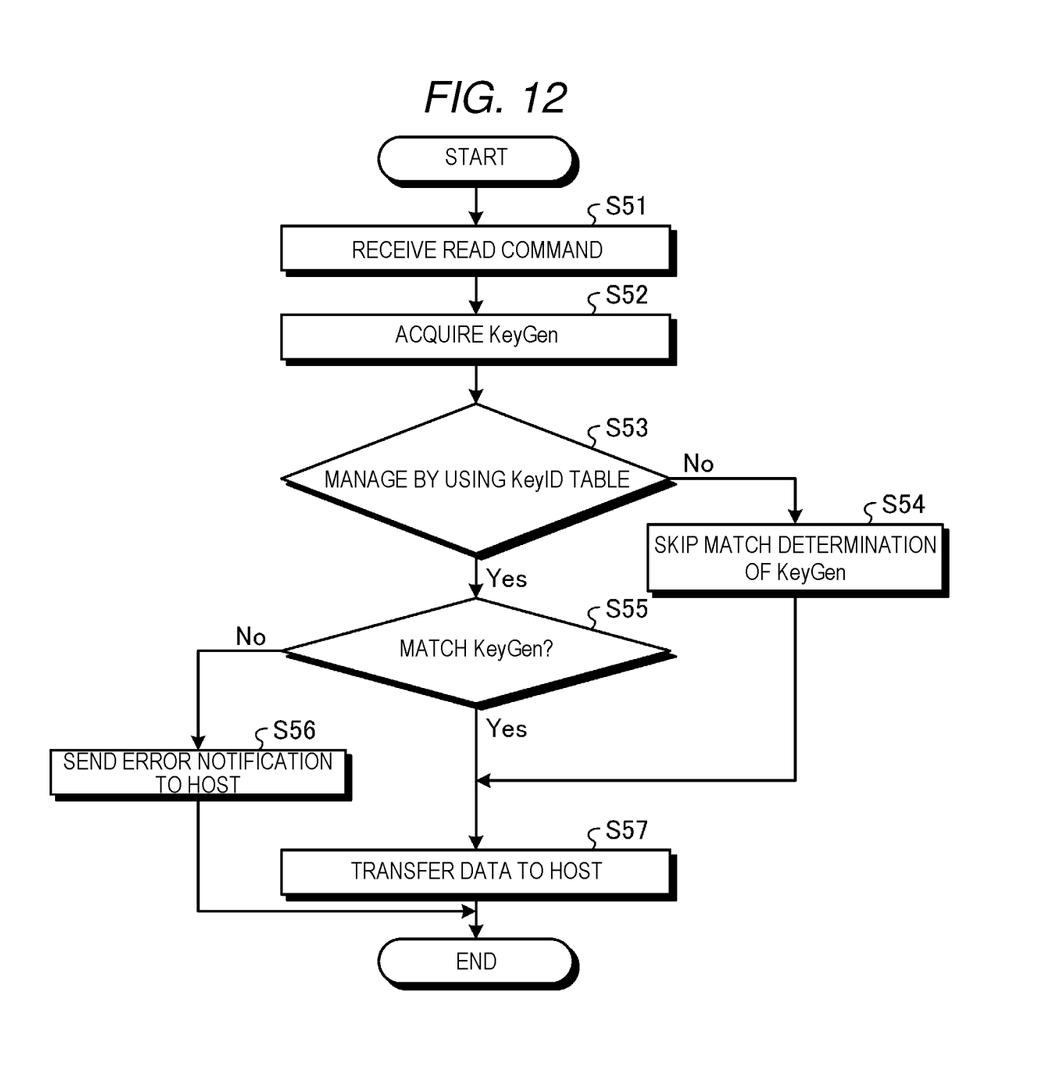
FIG. 12 is a flowchart of processes when a read command is received in the second embodiment.

Subsequently, a process performed when a read command is received according to the second embodiment will be described with reference to FIG. 12. FIG. 12 is a flowchart showing a process procedure when a read command is received according to the second embodiment.

Here, it is assumed that data in the KeyID table 60 and the Key table 70 are updated as shown in FIG. 11A to FIG. 11D. That is, the controller 30 adds the record information 61 in the KeyID table 60 and the record information 71 in the Key table 70 before performing the secure instance erase function. Then, the controller 30 performs the secure instance erase function, and then adds record information to the KeyID table 60 and the Key table 70.

The controller 30 receives the KeyTag from the host 2 and receives a read command (step S51). The controller 30 searches the Key table 70 for the record information 71 corresponding to the KeyTag received from the host 2. The controller 30 reads information including the decrypted user data and the KeyGen (step S52).

The controller 30 determines whether the KeyGen corresponding to the user data is included in any record information 61 in the KeyID table 60 by determining whether the KeyGen corresponding to the user data matches the KeyGen of any record information 61 in the KeyID table 60 (step S53).

When the KeyGen corresponding to the user data is not included in any record information 61 in the KeyID table 60 (No in step S53), which indicates that the read user data is user data encrypted before performing the secure instance erase function, matching determination of the KeyGen is skipped (step S54), and the process proceeds to step S57.

When the KeyGen corresponding to the user data is included in any record information 61 in the KeyID table 60 (Yes in step S53) and when the KeyGen corresponding to the user data and the KeyGen in the searched record information 71 match each other (Yes in step S55), the controller 30 outputs the read data to the host 2 (step S57). In addition, when the KeyGen corresponding to the user data and the KeyGen in the searched record information 71 do not match each other in step S55 (No in step S55), the controller 30 sends an error notification to the host 2 (step S56).

The magnetic disk device 1 according to the second embodiment does not send an error notification when there is no record information 61 including KeyGen read along with the user data after the secure instance erase function is performed and then a read command is received. Thus, when it is not necessary to determine whether an encryption key and a decryption key for user data before performing the secure instance erase function match each other, it is possible to prevent the magnetic disk device 1 from determining whether the encryption key and the decryption key match each other.

(Modification)

Although the above-described embodiments demonstrate a case where a KeyID is received from the host 2 and the received KeyID is stored in the KeyID table 60, a KeyID that is not used for a long period of time may be deleted. For example, the controller 30 transmits the record information 61 to the host 2 in response to a request from the host 2. When a KeyID is received from the host 2 thereafter, the controller 30 deletes the record information 61 corresponding to the KeyID. In addition, the controller 30 deletes the record information 71 including KeyGen in the record information 61 to be deleted.

In such a manner, it is possible to prevent the magnetic disk device 1 from maintaining information such as unnecessary KeyID and Key.

In addition, the controller 30 may store a KeyGen corresponding to the KeyID to be deleted from the host 2, and may entirely read the magnetic disk 11 at a predetermined timing and update a KeyGen of user data corresponding to the KeyGen to a value indicating that there is no KeyID.

Further, the magnetic disk device 1 may be virtually managed as a plurality of drives, similar to name space or logical unit number (LUN). In this case, the magnetic disk device 1 may store the KeyID table 60 and the Key table 70 for each drive (virtual region).

In this case, the magnetic disk device 1 can narrow a range of searching the KeyID table 60 and the Key table 70 by storing the KeyID table 60 and the Key table 70 together in the virtual region, and a processing load can be reduced.

In addition, although a case of an application to the magnetic disk device 1 is described in the above-described embodiments, applications to various other storage devices such as a solid state drive (SSD) may be possible.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
a volatile memory;
a nonvolatile memory; and
a controller configured to:
receive, from a host, a key setting request that includes a cryptographic key, a key ID thereof, and tag information of the cryptographic key;
generate generation information of the cryptographic key;
store a first entry including the tag information, the cryptographic key, and the generation information associated with each other in the volatile memory; and
store a second entry including the key ID and the generation information associated with each other in the nonvolatile memory.

2. The disk device according to claim 1, wherein the generation information indicates a number of cryptographic keys that have been set in the disk device.

3. The disk device according to claim 1, wherein the tag information indicates a storage region of the nonvolatile memory to which the cryptographic key is applied.

4. The disk device according to claim 1, wherein
the controller is further configured to:
determine whether or not an entry including the key ID is stored in the nonvolatile memory; and
upon determining that no entry including the key ID is stored in the nonvolatile memory, store the second entry in the nonvolatile memory.

5. The disk device according to claim 4, wherein no new entry is stored in the nonvolatile memory, when it is determined that an entry including the key ID is stored in the nonvolatile memory.

6. The disk device according to claim 4, wherein
the controller is further configured to:
upon determining that an entry including the key ID is stored in the nonvolatile memory, determine whether or not an entry including the tag information is stored in the volatile memory; and
upon determining that no entry including the tag information is stored in the volatile memory, store the first entry in the volatile memory.

7. The disk device according to claim 1, wherein no cryptographic key is stored in the nonvolatile memory in response to the key setting request.

8. The disk device according to claim 1, wherein
the controller is further configured to:

receive, from the host, a write request in association with user data and tag information;

obtain, from the first entry, the cryptographic key and the generation information using the tag information received in association with the write request;

encrypt the user data using the obtained cryptographic key; and write, into the nonvolatile memory, the encrypted user data and the obtained generation information in association with each other.

9. The disk device according to claim 8, wherein the controller is further configured to:

receive, from the host, a read request in association with tag information;

obtain, from the first entry, the cryptographic key using the tag information received in association with the read request;

read the encrypted user data and the generation information from the nonvolatile memory; and decrypt the encrypted user data using the cryptographic key obtained in response to the read request.

10. The disk device according to claim 9, wherein the controller is further configured to:

obtain, from the first entry, the generation information using the tag information received in association with the read request;

perform matching of the read generation information with the generation information obtained from the first entry in response to the read request;

transmit the decrypted user data to the host when the read generation information matches the generation information obtained from the first entry in response to the read request; and transmit an error notification to the host when the read generation information does not match the generation information obtained from the first entry in response to the read request.

11. The disk device according to claim 10, wherein the decrypted user data is not transmitted to the host when the read generation information does not match the generation information obtained from the first entry in response to the read request.

12. The disk device according to claim 10, wherein the controller is further configured to:

determine whether or not an entry in the nonvolatile memory includes the read generation information; and transmit the decrypted user data to the host without performing the matching when it is determined that no entry in the nonvolatile memory includes the read generation information.

13. The disk device according to claim 1, wherein the controller is further configured to:

receive, from the host, an erase request of the user data in association with the tag ID; and upon receiving the erase request, delete the first entry from the volatile memory and the second entry from the nonvolatile memory.

14. The disk device according to claim 13, wherein the user data is not erased from the nonvolatile memory in response to the erase request.

15. The disk device according to claim 1, wherein the controller is configured to:

generate, in the volatile memory, a plurality of first tables in association with a plurality of storage regions, respectively;

generate, in the nonvolatile memory, a plurality of second tables in association with the plurality of storage regions, respectively; and store the first entry in one of the first tables associated with a predetermined storage region, and the second entry in one of the second tables associated with the predetermined storage region.

16. The disk device according to claim 1, wherein the nonvolatile memory comprises one or more disks.

17. A storage device comprising:

a volatile memory;

a nonvolatile memory; and a controller configured to:

receive, from a host, a key setting request that includes a cryptographic key, a key ID thereof, and tag information of the cryptographic key;

generate generation information of the cryptographic key;

store a first entry including the tag information, the cryptographic key, and the generation information associated with each other in the volatile memory; and store a second entry including the key ID and the generation information associated with each other in the nonvolatile memory.

18. The storage device according to claim 17, wherein the nonvolatile memory comprises a semiconductor storage device.

19. The storage device according to claim 18, wherein the generation information indicates a number of cryptographic keys that have been set in the storage device.

20. The storage device according to claim 18, wherein the tag information indicates a storage region of the nonvolatile memory to which the cryptographic key is applied.

* * * * *